Nov. 13, 1945.  W. R. SMITH  2,389,006
FEATHER PICKER FOR FOWLS
Filed June 10, 1944

Inventor
Walter R. Smith
Warren D. House
By
His Attorney

Patented Nov. 13, 1945

2,389,006

UNITED STATES PATENT OFFICE 2,389,006

FEATHER PICKER FOR FOWLS

Walter R. Smith, Kansas City, Kans.

Application June 10, 1944, Serial No. 539,680

2 Claims. (Cl. 17—11.1)

My invention relates to improvements in feather pickers for fowls.

The object of my invention is to provide a feather picker of the kind described in which the feathers are plucked from a fowl by a cooperating pair of cylindrical pinching rollers located in a passage in a supporting casing, novel means being provided for oppositely rotating the rollers, and which provides means for forcing a current of air from the rollers through the passage to carry therefrom the feathers plucked by the rollers from the fowl that is being picked.

A further object of my invention is the provision of novel means for supporting the body of the fowl that is being picked in close proximity to the plucking rollers, so that the feathers may be readily plucked while holding the body from contact with the rollers.

Still another object of my invention is the provision of a device of the kind described, which is simple, strong, durable, not likely to get out of order, which is cheap to make and operate, and which is efficient in its operation.

The novel features of my invention are hereinafter fully described and claimed.

In the accompanying drawing, which illustrates the preferred embodiment of my invention, Fig. 1 is a side view of my improved picker, shown partly in elevation and partly in vertical section, with some parts broken away.

Similar characters of reference designate similar parts in the different views.

Figure 1:
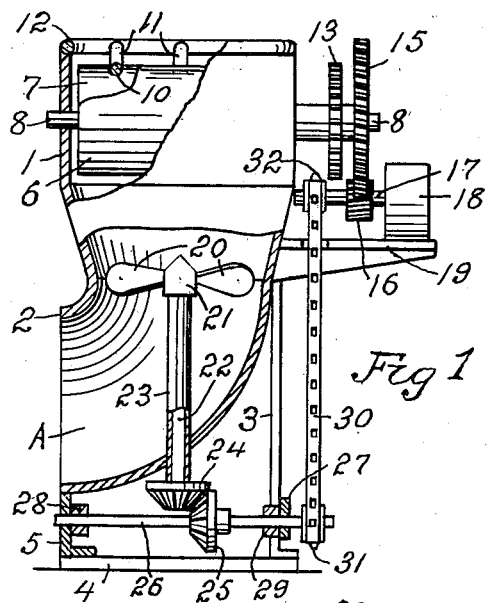

The picker is provided with a casing comprising an upright rectangular intake portion 1 having an open upper end, and which merges downwardly into an arcuate laterally extending outlet portion 2. The casing is supported at one side by a bracket 3 mounted on a platform 4, and at its lower end by a bracket 5 also mounted on the platform 4.

The portions 1 and 2 form a passage A through the casing. In said passage, in the upper rectangular portion 1 of the casing, are two parallel, horizontal rollers 6 and 7, disposed side by side with their adjacent sides contacting with each other, said rollers being of like diameters and respectively provided with supporting shafts 8 and 9 which are rotatably mounted in opposite sides of the rectangular portion 1 of the casing. The rollers 6 and 7 may be of any suitable material, preferably soft rubber, that will readily grip the feathers from the fowl that they are to pluck.

The plucking rollers 6 and 7 are revolved in opposite directions with their adjacent sides moving downwardly, and the body of the fowl that is being plucked is supported between and closely to the rollers by the depressed portions 10 of grid rods 11 which extend above and transversely across the rollers 6 and 7 and are fastened at their ends to and supported by opposite sides of a rectangular grid bar 12 mounted on the upper end of the portion 1 of the casing.

The body of the fowl is supported upon the depressed middle portions 10 of the grid rods 11 in different positions required for its feathers to be extended between the grid rods and gripped by and plucked between the rollers 6 and 7.

Figure 2:
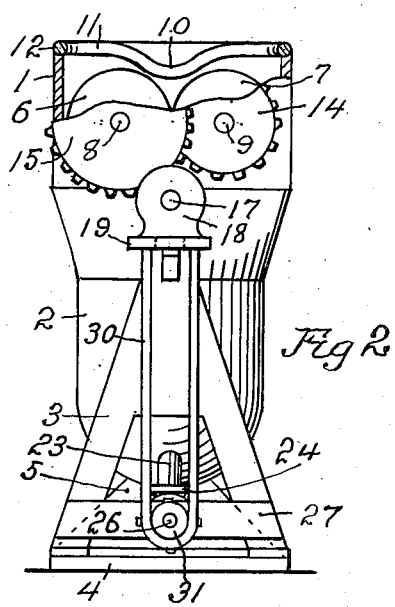
Fig. 2 is a view similar to Fig. 1, looking at another side of the picker.
Figure 3:
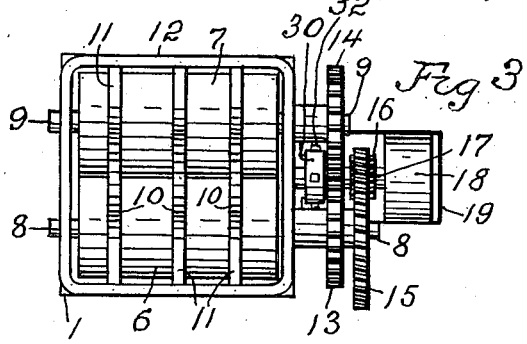
Fig. 3 is a top view of the picker.
Figure 4:
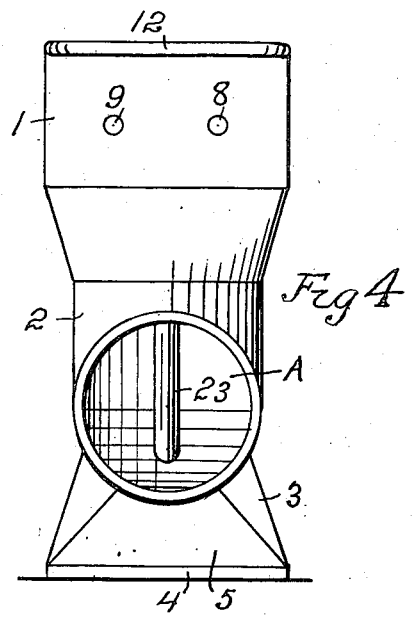
Fig. 4 is an elevation of the picker looking at the side opposite to that shown in Fig. 2.

For revolving the rollers 6 and 7, two intermeshing spur gears 13 and 14 are respectively fastened rigidly to the shafts 8 and 9 at the outer side of the casing. Secured to the shaft 8 is a spur gear wheel 15 which meshes with a spur gear wheel 16 on the driving shaft 17 of an electric motor 18 mounted on a shelf 19 attached to one side of the casing 1—2. The motor shaft 17 is rotated counterclockwise, as viewed in Fig. 2, thereby, through the gearing 16, 15, 13 and 14, and shafts 8 and 9, revolving the roller 6 clockwise and the roller 7 counterclockwise.

For discharging the feathers plucked by the rollers 6 and 7 downwardly and out of the casing passage A, means are provided for forcing a current of air downwardly through the passage. This means, as shown in the drawing, comprises a fan having radial blades 20 mounted on a hub 21. The hub 21 is rigidly secured on the upper end of a vertical shaft 22 rotatably mounted in and extending through a vertical tube 23, which extends through and is fastened to the curved lower side of the casing portion 2. The tube 23 extends into the casing passage A with its upper end disposed centrally in the passage adjacent to the upper end of the curved portion thereof. The fan hub 21 rests on the upper end of the tube 23.

Mechanism is provided for revolving the fan blades 20 clockwise, as viewed from above, which mechanism, as shown in the drawing, comprises two intermeshing bevel gears 24 and 25 respectively fastened to the shaft 22, below the casing portion 2, and to a horizontal shaft 26 that is mounted in the bracket 5 and in a cross bar 27 fastened on the bracket 3. Two collars 28 and 29 fastened on the shaft 26 and bearing respectively against the brackets 5 and 3 hold the shaft 26 from endwise movement. Rotation of the shaft 26 is effected by an endless belt 30 connecting a sprocket wheel 31 on the shaft 26 with a sprocket wheel 32 fastened on the motor shaft 17.

The fan blades 20 are angled as shown in Fig. 1, so as to cause the air current to be driven downwardly through the passage A from the plucking rollers 6 and 7.

In operation, when the motor 18 is operated, the plucking rollers 6 and 7 will be operated, as has been described, to pick the feathers from the fowl, which is being held on the grid rods 10—11 by the operator. The feathers, discharged from the rollers 6 and 7, will be carried by the downward current of air, past the fan blades 20 and the supporting tube 23 and out of the lower curved portion 2, where they may be caught by a desired receptacle, not shown.

With the employment of cylindrical plucking rollers which contact with each other throughout a revolution, a feather once gripped is not released until discharged from the rollers, and a clean thorough picking operation is effected.

Many modifications of my invention, within the scope of the appended claims, may be made without departing from the spirit of my invention.

What I claim is:

1. In a feather picker for fowls, a casing having a passage with an upright intake portion with an open end and merging into a laterally extending outlet portion with an open end, two parallel cylindrical horizontal plucking rollers rotatably mounted in said intake portion, side by side and with their peripheries contacting with each other throughout each revolution, grid rods extending transversely across said rollers with their middle portions depressed between and closely adjacent to said rollers between said intake end and said rollers and adapted to support the body of a fowl that is being plucked, means supporting the ends of said grid rods, means for revolving said rollers in opposite directions with their adjacent sides moving downwardly, a fan in said passage below said rollers, a shaft extending through said casing into said passage, means rotatably supporting said shaft, means by which said shaft revolves said fan, and means for rotating said shaft in a direction such that said fan will be revolved to force air downwardly from said rollers through said passage.

2. In a feather picker for fowls, a casing having a passage with an upright intake portion with an open end and merging into a laterally extending outlet portion with an open end, two parallel cylindrical horizontal plucking rollers rotatably mounted in said intake portion, side by side and with their peripheries contacting with each other throughout each revolution, grid rods extending transversely across said rollers with their middle portions depressed between and closely adjacent to said rollers between said intake end and said rollers and adapted to support the body of a fowl that is being plucked, means supporting the ends of said grid rods, means for revolving said rollers in opposite directions with their adjacent sides moving downwardly, a fan in said passage below said rollers, a shaft extending vertically through said casing into said passage and having said fan fastened thereon, means rotatably supporting said shaft, and means for rotating said shaft in a direction such that said fan will be revolved to force air downwardly from said rollers through said passage.

WALTER R. SMITH.